(12) United States Patent
Arlaban Gabeiras et al.

(10) Patent No.: US 8,896,142 B2
(45) Date of Patent: Nov. 25, 2014

(54) WIND TURBINE CONTROL METHOD

(75) Inventors: Teresa Arlaban Gabeiras, Sarriguren (ES); Oscar Alonso Sadaba, Sarriguren (ES); Ana Huarte Amezqueta, Sarriguren (ES); Alberto García Barace, Sarriguren (ES); José Miguel García Sayes, Sarringuren (ES); Ricardo Royo García, Sarriguren (ES); Stephen Tonks, Sarriguren (ES); Miguel Núñez Polo, Sarriguren (ES)

(73) Assignee: Acciona Windpower, S.A. (ES)

( * ) Notice: Subject to any disclaimer, the term of this patent is extended or adjusted under 35 U.S.C. 154(b) by 962 days.

(21) Appl. No.: 12/996,046

(22) PCT Filed: Jun. 3, 2009

(86) PCT No.: PCT/ES2009/070200
§ 371 (c)(1),
(2), (4) Date: Mar. 15, 2011

(87) PCT Pub. No.: WO2009/147274
PCT Pub. Date: Dec. 10, 2009

(65) Prior Publication Data
US 2011/0156389 A1 Jun. 30, 2011

(30) Foreign Application Priority Data
Jun. 6, 2008 (ES) .................................. 200801706

(51) Int. Cl.
*F03D 9/00* (2006.01)
*H02P 9/04* (2006.01)

(52) U.S. Cl.
USPC .......................................................... 290/44

(58) Field of Classification Search
CPC ................. H02J 3/38; F03D 9/00; H02P 9/42
USPC ........................ 290/44, 55; 700/286, 287, 290
See application file for complete search history.

(56) References Cited

U.S. PATENT DOCUMENTS

| 5,225,712 A * | 7/1993 | Erdman ........................... 290/44 |
| 5,798,633 A * | 8/1998 | Larsen et al. .................. 323/207 |

(Continued)

FOREIGN PATENT DOCUMENTS

| EP | 1 512 869 A1 | 3/2005 |
| WO | WO 03/030329 A1 | 4/2003 |

(Continued)

OTHER PUBLICATIONS

International Search Report mailed Nov. 2, 2009 in corresponding PCT International Application No. PCT/ES2009/070200.

(Continued)

*Primary Examiner* — Julio Gonzalez
(74) *Attorney, Agent, or Firm* — Ostrolenk Faber LLP

(57) ABSTRACT

The present disclosure relates to a method for controlling a wind turbine of the type including a rotor, a generator, a frequency converter, a control unit and means for connecting to a wind farm grid, using means for receiving a local voltage reference value ($V_{REF}$) and a regulator (1) which calculates the reactive power to be generated ($Q_T$) as a function of the voltage error ($\Delta V$), such that it can be operated over the entire voltage range. The system also includes: at least one saturator element (2, 6, 7) in which the reactive power to be generated is limited, whereby the limits ($Q_{\_MAX}$, $Q_{\_MIN}$, $Q_{C\_MAX}$, $Q_{C\_MIN}$, $Q_{S\_MAX}$, $Q_{S\_MIN}$) are calculated dynamically as a function of the voltage, this block outputting a reference reactive power of the wind turbine ($Q_{\_REF}$, $Q_{C\_REF}$, $Q_{s\_REF}$); and an element (3) for calculating the actual limit of the active power ($P_{MAX}$) as a function of the pre-limited reactive power ($Q_{\_REF}$, $Q_{s\_REF}$) and the apparent power available at that moment.

15 Claims, 8 Drawing Sheets

(56) References Cited

U.S. PATENT DOCUMENTS

| | | | |
|---|---|---|---|
| 6,486,639 B1* | 11/2002 | Montret et al. | 322/29 |
| 6,906,431 B2 | 6/2005 | Wobben | 290/44 |
| 6,921,985 B2 | 7/2005 | Janssen et al. | 290/44 |
| 6,965,174 B2 | 11/2005 | Wobben | 290/44 |
| 7,166,928 B2* | 1/2007 | Larsen | 290/55 |
| 7,579,702 B2* | 8/2009 | Park et al. | 290/44 |
| 7,638,983 B2* | 12/2009 | Park et al. | 322/20 |
| 2005/0071050 A1* | 3/2005 | Chow et al. | 700/286 |
| 2006/0208574 A1* | 9/2006 | Lasseter et al. | 307/69 |
| 2007/0108771 A1* | 5/2007 | Jones et al. | 290/44 |
| 2007/0273155 A1 | 11/2007 | Barton et al. | 290/44 |
| 2010/0109328 A1* | 5/2010 | Li et al. | 290/44 |

FOREIGN PATENT DOCUMENTS

| | | |
|---|---|---|
| WO | WO 2005/031160 A2 | 4/2005 |
| WO | WO 2005/099063 A1 | 10/2005 |
| WO | WO 2006/037576 A1 | 4/2006 |
| WO | WO 2006/120033 A2 | 11/2006 |
| WO | WO 2008/031433 A1 | 3/2008 |

OTHER PUBLICATIONS

Written Opinion mailed Nov. 2, 2009 in corresponding PCT International Application No. PCT/ES2009/070200, along with English translation thereof.

Lars Helle, "Modeling and Comparison of Power Converters for Doubly Fed Induction Generators in Wind Turbines," Ph.D. Thesis, Aalborg University, Denmark, Institute of Energy Technology, Apr. 10, 2007, 409 pages.

Yifan Tang et al., "A Flexible Active and Reactive Power Control Strategy for a Variable Speed Constant Frequency Generating System," IEEE Transaction on Power Electronics, vol. 10, No. 4, pp. 472-478, Jul. 1995.

* cited by examiner

WIND TURBINE CONTROL METHOD

CROSS REFERENCE TO RELATED APPLICATIONS

The present application is a 35 U.S.C §371 National Phase conversion of PCT/ES2009/070200, filed Jun. 3, 2009, which claims benefit of Spanish Application No. P200801706, filed Jun. 6, 2008 the disclosure of which is incorporated herein by reference. The PCT International Application was published in Spanish language.

OBJECT OF THE INVENTION

The following invention, as expressed in the specification title, relates to a wind turbine control method, whereby, a first object of the invention is to generate reactive power throughout the whole voltage range without the need for special action in the event of a substantial power dip in the grid.

A second object of the invention is to limit the power extracted from wind according to the power that can be evacuated to the grid at any given time.

FIELD OF THE INVENTION

The present specification describes a control method, particularly for use by incorporation into wind turbines and whose function is to maintain the grid voltage of wind farms stable through the generation of reactive power.

BACKGROUND OF THE INVENTION

With the increased penetration of wind generation into the grid, various ancillary services are being requested to such generators, such as voltage and frequency control, to ensure their proper integration into the grid.

Thus, active and reactive power controls have been developed to help stabilize the frequency and voltage, respectively, in normal operation, understanding this operating range to be that specified in the corresponding grid code.

Conventionally, two different strategies have been used to control the voltage of the wind turbines in normal operation.

The first strategy has been to incorporate wind farm controllers which, based on the voltage measured at the wind farm connection point, send reactive power or power factor set points to the wind turbines. Examples of this type of control can be found in patent application EP1433238 and part of what is disclosed in U.S. Pat. No. 7,166,928B2.

The disadvantage of this solution is that to achieve a rapid response, a sophisticated communication network connecting the wind farm controller to the wind turbines is required.

Another disadvantage of this system is that, as the terminal voltage of the wind turbines is not controlled, the reactive power set point requested from the wind turbine may change it, possibly exceeding the allowed voltage range and causing the shutdown of the machine.

The second strategy has been to incorporate terminal voltage controllers in the wind turbines. An example of this type of control can be found in U.S. Pat. No. 6,965,174 B2.

This type of control provides a rapid response and requires no additional substation control equipment, since the wind turbines always incorporate controllers and measurements of the connection terminal voltage.

However, the disadvantage is that it only controls the local voltage, whose value is not relevant if kept within specified operating ranges. On the other hand, the voltage at the farm connection point is not controlled and therefore may be subject to variations.

Solutions whereby local controls are implemented integrated with central controls at farm level, thereby improving the response of the previous controls, are found in the following patent applications EP1512869A1, WO2006037576A1 and WO2006120033A2.

In addition, in recent years other ancillary services are being demanded in view of grid events, such as the generation of reactive power in a voltage dip, whereas previously the only requirement was to remain connected to the grid during the failure.

In the same way as in normal operation, several controls have been developed for the generation of reactive power in the event of a voltage dip in order to contribute to the restoration of voltage, as shown in the patent application US2007/0273155 A1.

The disadvantage of such references is that to comply with all grid requirements, they have specific controls for normal operation and other specific controls for different grid events such as the aforementioned voltage dips, so that at the time of a failure occurring, the controls associated with operating in normal mode are deactivated to enable the fault control, thus producing discontinuities in the control.

Similarly, upon restoring the voltage, the type of control must change again and the variables of the different controllers have to be recalculated and adapted to new grid conditions, through a series of complex calculations. This series of discontinuities in the control generate a response of the wind turbine in terms of the grid integration that may be improved and complex controller initialization algorithms are required for proper operation.

On the other hand, the wind turbines have to stay connected to the grid during voltage dips for more or less time and for different depths depending on the applying grid code in each case.

The electric power that can be evacuated to the grid decreases proportionally to the depth of the dip. If the power captured from the wind remains unchanged and the electrical power that can be evacuated is less than the former, there is an acceleration of the rotor which can lead the machine to an emergency stop due to excessive speed, thereby failing to comply with the aforementioned grid codes.

U.S. Pat. No. 6,921,985 discloses a blade pitch control in response to the transition between a first mode of operation and a second mode of operation, given such transition by the event of a voltage dip in the grid. The aforementioned patent identifies voltage dip depth thresholds based on which the mode of operation is adjusted.

Patent application WO2008/031433 discloses a method for controlling the blade pitch in the transition between the voltage dip and normal operation, whereby a variable of the power supply (e.g. voltage) is measured and translated into a variable that takes a value in a normal situation and another different value in a voltage dip.

The abovementioned background documents limit the capture solely based on the detection or not of a dip, which on the one hand can lead to a limitation in situations where it is not necessary, or not limit in others where it is necessary, depending both on the voltage range in which "voltage dip mode of operation" is detected and on the wind power available.

U.S. Pat. No. 6,906,431 B2 discloses a method of controlling a wind farm whereby constant apparent power is generated.

The relationship is known between apparent power (S), voltage (V), current (i), active power (P) and reactive power (Q) according to the well-known expression:

$$S = v \ast i = \sqrt{P^2 + Q^2}$$

Patent application WO2005031160A2 explains the concept of apparent power available of an electrical unit, which depends on the grid voltage and the maximum current that the equipment can withstand. Said application discloses a method for voltage dips whereby the reactive current set point (in quadrature with the voltage) is limited in terms of the maximum available current and the active current (in phase with the voltage).

On the other hand, "*Lars Helle*" published in his doctoral thesis (Apr. 10, 2007): "Modeling and comparison of power converters for doubly fed induction generators in wind turbines" the development of a tool suitable for comparing different power converter topologies for use in a wind turbine application based on the doubly-fed induction generator. The main focus in this thesis is to establish a simple, fast and accurate simulation tool for evaluating different power converter topologies for use in a wind turbine based on the doubly-fed induction generator. The objective is to be able to compare the turbine efficiency when using the different power converter topologies. Specifically, the report treats four power converter topologies, namely the back-to-back two level voltage source converter, the matrix converter, the back-to-back diode clamped three-level voltage source converter and the back-to-back transistor clamped three-level voltage source converter. It also provides a model for the wind turbine blade, given that the power captured from the wind depends on the blade design, the pitch angle and the tip speed ratio, and assuming that the wind turbine tracks the optimum pitch angle as long as the generated wind turbine power is below the nominal power of the system.

Variable-speed constant-frequency generating systems are used in wind power, hydroelectric power, aerospace and naval power generation applications to enhance efficiency and reduce friction. In these applications, a candidate is the slip power recovery system comprising a doubly excited induction machine or doubly excited brushless reluctance machine and PWM power converters with a DC link. In the article published by Yifan Tang and Longya Xu [vol. 10, issue 4, July 1995] in IEEE Transactions on Power Electronics, a flexible active and reactive power control strategy is developed, such that the optimal torque-speed profile of the turbine can be followed and overall reactive power can be controlled, while the machine copper losses have been minimized. At the same time, harmonics injected into the power network have also been minimized. In this manner, the system can function as both an efficient power generator and a flexible reactive power compensator.

DESCRIPTION OF THE INVENTION

The present specification discloses a method for controlling a wind turbine of the type comprising a rotor, a generator, a frequency converter, a control unit and means for connecting to a wind farm grid, said method comprising the steps whereby from a local voltage set point ($V_{REF}$) and calculating at least one initial set point of reactive power ($Q_T$) to be generated based on the voltage error ($\Delta V$), so that it operates throughout the voltage range and further comprises the following steps:

limitation of the initial reactive power set point ($Q_T$), applying limits ($Q\_{MAX}$, $Q\_{MIN}$) calculated on the basis of the local voltage measured ($V_{MED}$), thus obtaining at least one final set point of reactive power ($Q\_{REF}$);

calculation of a maximum limit of active power ($P\_{MAX}$) depending on the final set point of reactive power ($Q\_{REF}$) and the apparent power available at that time.

This method further comprises the step of calculating the local voltage set point ($V_{REF}$) based on the error between a given primary set point of reactive power ($Q_i$) and the reactive power generated by the wind turbine ($Q_{i\_MED}$). This primary set point of reactive power ($Q_i$) may be, for example, received from a wind farm controller via the wind farm communication network.

In the event of a doubly fed induction wind turbine, the initial set point of reactive power to be generated by the turbine ($Q_T$) is divided into two set points, an initial power set point referred to the reactive power generated by the generator stator ($Q_S$) and an initial set point referred to the reactive power generated by the grid-side converter ($Q_C$) according to a distribution parameter ($\alpha_{distribution}$) which optimizes the temperature of the components of the electrical system.

In the aforementioned case wherein the turbine is doubly fed and according to another aspect of the invention, the initial set point value of reactive power to be generated by the stator ($Q_S$) and the initial set point of reactive power to be generated by the grid-side converter ($Q_C$) are restricted, thus obtaining a final set point of reactive power to be generated by the stator ($Q_{S\_REF}$) and a final set point of reactive power to be generated by the grid-side converter ($Q_{C\_REF}$).

In a first embodiment of the invention, the primary set point of reactive power ($Q_i$) is calculated based on the error between the voltage at the wind farm connection point ($V_{PCC}$) and a voltage set point at the connection point ($V_{PCC\_REF}$) and because the voltage is received at the connection point ($V_{PCC}$) via the wind farm communication network.

According to said first embodiment of the invention and in another aspect of the invention, the reactive power set point ($Q_{ref}$) is corrected based on the error between the total reactive power demanded by the wind farm and the measured reactive power generated by the group of wind turbines operating in the wind farm ($Q_{GLOBAL\_MED}$) in a reference tracking loop, with the addition of a term ($\Delta Q_{ref}$) to compensate for such error.

In a second embodiment of the invention, the primary set point of reactive power ($Q_i$) of the reactive power control loop is generated from a voltage control at the wind farm connection point ($V_{PCC}$) performed at machine level.

According to the aforementioned second embodiment of the invention and in another aspect of the invention, a set point of the voltage at the wind farm connection point to the grid ($V_{PCC\_REF}$) is received via the communication network of the wind farm.

On the other hand, if the turbine is connected to the wind farm grid by means of a transformer in a first aspect of the invention, the reactive power set point ($Q_{REF}$) is estimated based on the voltage of the wind farm grid ($V_{BUS}$) by means of an incorporated regulator at a machine level.

Moreover, if the turbine is connected through a transformer to the wind farm grid and in a second aspect of the invention, the set point of local voltage ($V_{REF}$) corresponds to a set point of voltage of the wind farm grid, the voltage error ($\Delta V$) is calculated as the difference between the local voltage set point ($V_{REF}$) and the estimated wind farm grid voltage ($V_{REF\_EST}$).

In the said case wherein the turbine is connected through a transformer to the farm grid, in a third aspect of the invention, the initial set point of reactive power ($Q_T$) is restricted simply by applying limits calculated based on the transformer model and voltage, current and power factor measurements, such that the terminal voltage limits of the machine or wind turbine should not be exceeded.

In another aspect of the invention, the power extracted from the wind is limited according to the maximum limit of active power ($P_{\_MAX}$) that can be evacuated to the grid. For this purpose a term for the correction of the blade pitch angle ($\Delta\beta$) is calculated according to the difference between the maximum limit of active power ($P_{\_MAX}$) which can be evacuated to the grid and an indicative value of the available mechanical power ($P_{\_MEC}$).

An indicative value of the available mechanical power ($P_{\_MEC}$) is calculated according to the power generated at the time before a sudden decrease in the maximum limit of active power ($P_{MAX}$).

The torque or power set point is calculated according to the correction of the blade pitch angle ($\Delta\beta$).

Such calculation of the correction term of the blade pitch angle ($\Delta\beta$) is moreover performed depending on the current position of the blade ($\beta$).

Another object of the invention is a wind turbine comprising a rotor, a generator, a frequency converter, a control unit and means for connecting to the wind farm grid, so that said control unit is adjusted to implement a method disclosed herein.

A further object of the invention is a method of controlling a wind farm consisting of at least two wind turbines such as those described and a wind farm communication network, characterized in that it comprises the following steps:
- measurement of the voltage at the wind farm connection point ($V_{PCC}$),
- calculation of the primary set point of reactive power ($Q_i$) according to the difference between the voltage at the wind farm connection point and the voltage set point ($V_{PCC\_REF}$), and
- sending the reactive power set point ($Q_i$) to the wind turbines through the wind farm communication network.

To complement the following description, and to aid towards a better understand of the characteristics of the invention, a set of drawings is attached to this specification, and whose figures represent the most characteristic details of the invention for the purpose of illustration and without limiting the scope of this invention.

DESCRIPTION OF A PREFERRED EMBODIMENT

Figure 1:
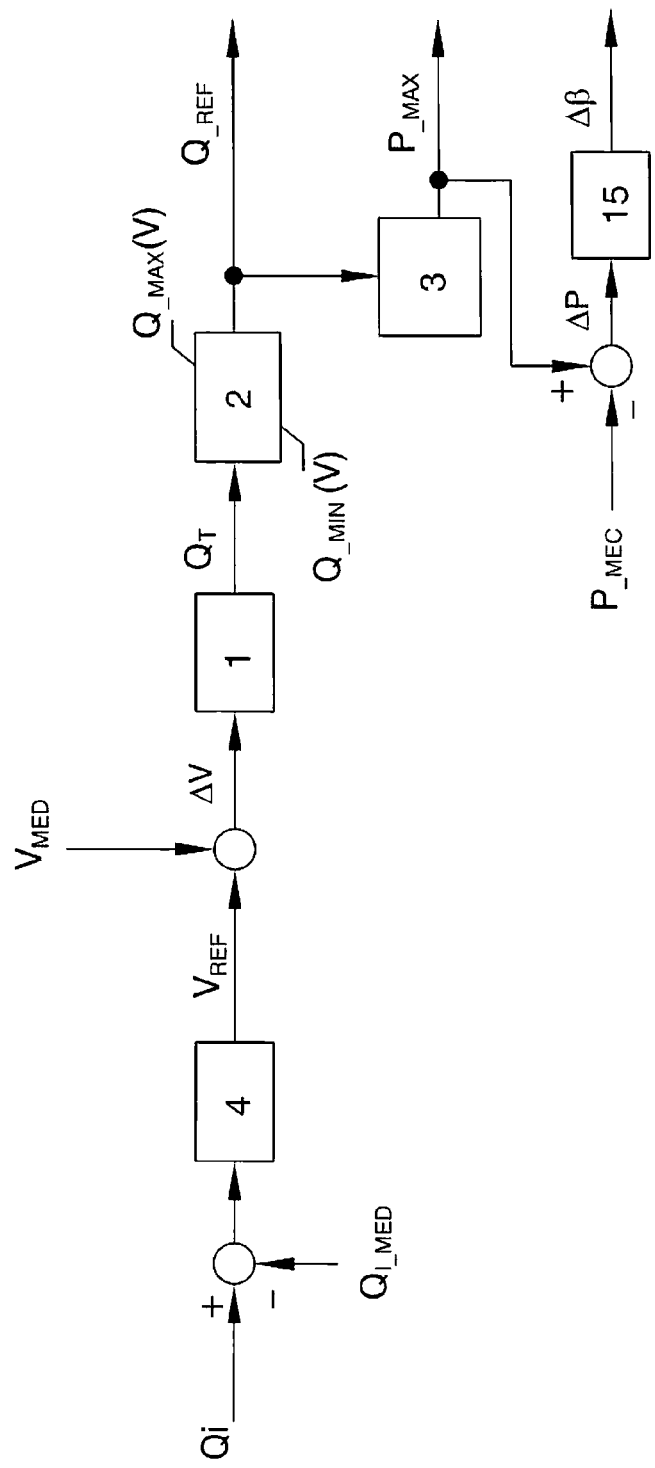
FIG. 1. shows a diagram of the core control method of the invention.

In view of the aforementioned figures and according to the numbering used, FIG. 1 shows a preferred embodiment of the method described herein.

Thus, from the difference between the local voltage set point value ($V_{REF}$) of the wind turbine and the local voltage measured ($V_{MED}$), the voltage error ($\Delta V$) is calculated, which constitutes the input signal to the reactive power regulator 1.

The output of this block is the initial set point of reactive power to be generated by the turbine ($Q_T$). This initial set point is limited in saturation element 2, in which the maximum and minimum limits of reactive power ($Q_{\_MAX\_v}$) and ($Q_{\_MIN\_v}$) are calculated dynamically based on the local measured voltage ($V_{MED}$). The output of the saturation element 2 is the final set point value of reactive power ($Q_{\_REF}$). In an element 3 the maximum limit of active power ($P_{\_MAX}$) is calculated based on the final set point of reactive power ($Q_{\_REF}$) and the apparent power available at that time.

Said maximum limit of active power ($P_{\_MAX}$) specifies the maximum value of active power allowed for the wind turbine to maintain at all times the required current capacity to generate reactive power adjusted to the voltage level.

Thus there are no discontinuities in the voltage control since the mode of operation does not change depending on the magnitude of the voltage deviation.

According to a preferred embodiment the wind turbine has means for determining the reactive power it is generating ($Q_{i\_MED}$), and the local voltage set point ($V_{REF}$) is calculated in a second regulator 4 based on the error between a given primary set point of reactive power ($Q_i$) and the reactive power generated ($Q_{i\_MED}$) by the wind turbine. This primary set point of reactive power ($Q_i$) may be, for example, received from a wind farm controller via the wind farm communication network.

Figure 2:
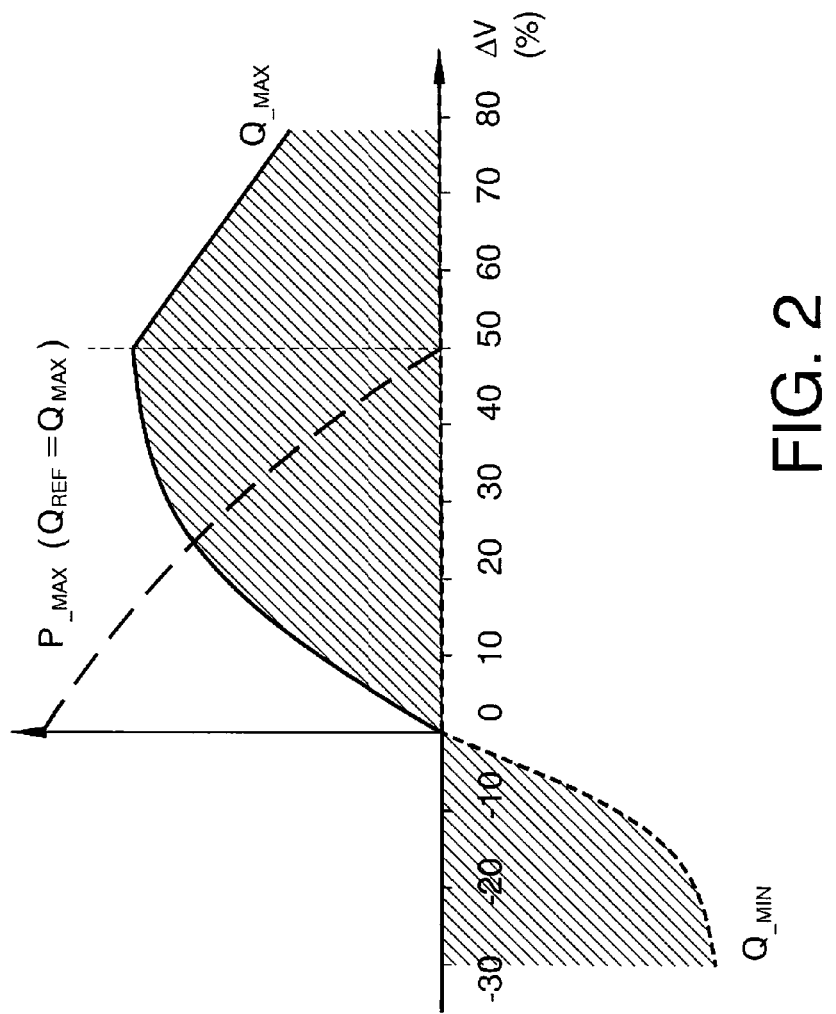
FIG. 2. shows a graph of the voltage control characteristics according to a preferred embodiment of the invention.

FIG. 2 shows the relation between the maximum limit of reactive power ($Q_{\_MAX\_v}$) and the voltage error ($\Delta V$) in a preferred embodiment. According to this embodiment, for voltage differences below 50% of the maximum limit of reactive power ($Q_{\_MAX\_v}$) it increases and may be expressed as follows:

$$Q_{MAX\_v} = k_1 * \Delta V^2 + k_2 * \Delta V$$

where ($K_1$) and ($K_2$) are constants. For voltage differences greater than 50% of the maximum reactive power limit ($Q_{\_MAX\_v}$) it decreases linearly and for differences of less than 0% it is constant and equal to zero so as not to contribute to an increase in the voltage error ($\Delta V$).

FIG. 2 also shows the minimum limit of reactive power based on the voltage deviation ($\Delta V$). In this case for positive voltage deviations, the lower limit of reactive power ($Q_{\_MIN\_v}$) defines the minimum reactive power that can be generated without contributing to an increase in the voltage deviation ($\Delta V$). However, negative deviations are as follows:

$$Q_{MIN\_v} = k_1 * \Delta V^2 + k_2 * \Delta V$$

FIG. 2 also shows how the maximum limit of active power ($P_{\_MAX}$) (in the particular case wherein $Q_{\_REF} = Q_{MAX}$) decreases with the voltage deviation ($\Delta V$) until disappearing with voltage deviations ($\Delta V$) greater than 50%.

Figure 3:
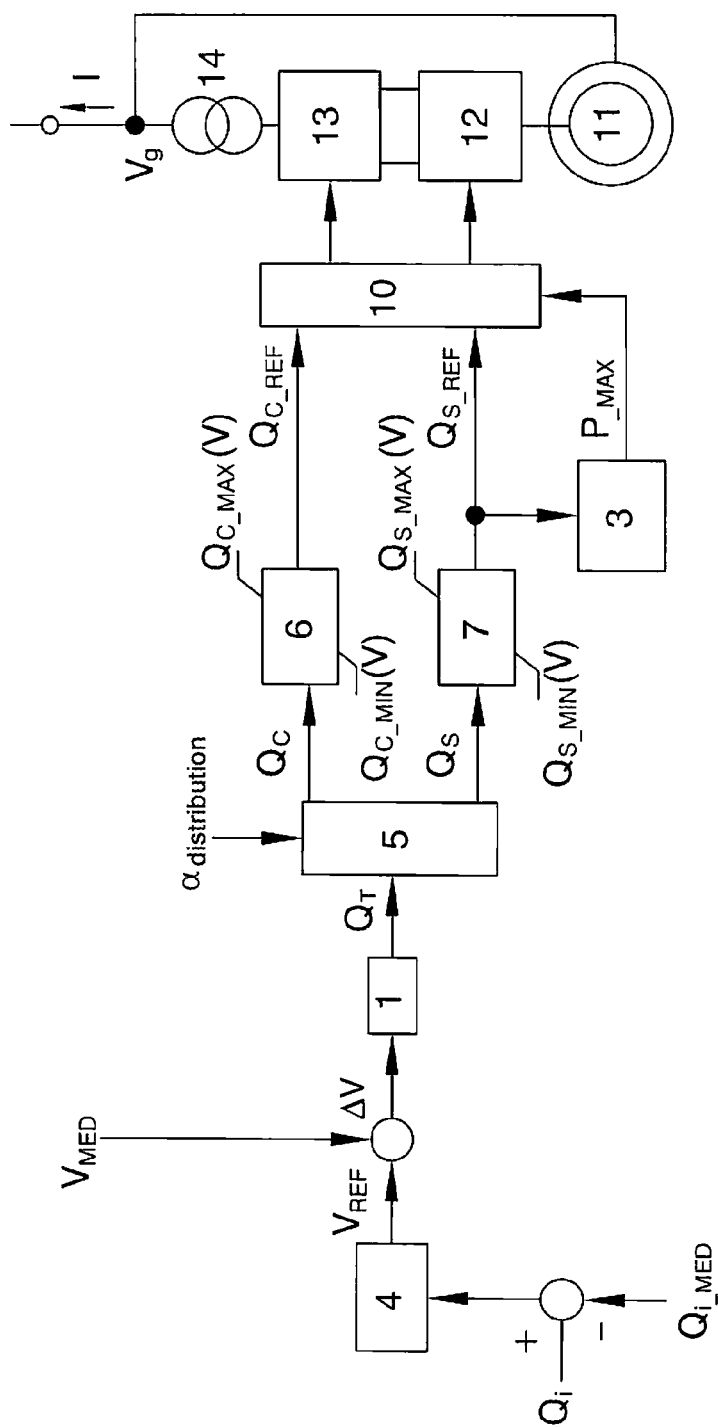
FIG. 3. shows a diagram of the control method of a preferred embodiment wherein the wind turbine comprises a doubly fed induction generator.

FIG. 3 shows a diagram of a preferred embodiment of the invention in the particular case in which the wind turbine is a doubly fed induction turbine. In this case, the block corresponding to the control system of the present invention includes a distribution block 5 which divides the initial set point of reactive power for the wind turbine ($Q_T$) into two set points, an initial set point of reactive power to be generated by the generator stator ($Q_S$) and an initial set point of reactive power to be generated by the grid-side converter ($Q_C$), according to a distribution parameter ($\alpha_{distribution}$).

Said distribution parameter ($\alpha_{distribution}$) is based on the temperature of the electrical components of the wind turbine (stator, rotor, machine-side converter and grid-side converter, transformer, etc.) and aims to optimize the thermal status of the system components.

The distribution is performed such that at the output, the quantities of initial set point of reactive power to be generated by the generator stator ($Q_S$) and the initial set point of reactive power to be generated by the grid-side converter ($Q_C$) are appropriate for a proper voltage control and optimize the evolution of the temperature of all electrical system components.

These amounts are limited in both saturation elements 6 and 7 whose limits of reactive power of the grid-side converter and those of the generator stator ($Q_{C\_MAX}$, $Q_{C\_MIN}$, $Q_{S\_MAX}$ and $Q_{S\_MIN}$) respectively, are calculated based on the voltage and active power and temperature providing at the output reactive power references for the grid-side converter and stator ($Q_{C\_REF}$, $Q_{S\_REF}$) respectively.

In the same way, in an element 3 the maximum limit of active power ($P_{\_MAX}$) is calculated depending on the final set point of reactive power ($Q_{S\_REF}$) and the apparent power available at that time. Said maximum limit of active power ($P_{\_MAX}$) specifies the maximum active power value allowed for the machine to maintain at all times the current capacity required to generate reactive power adjusted to the voltage level.

These final set points of reactive power of the generator stator ($Q_{S\_REF}$) and the grid-side converter ($Q_{C\_REF}$), and the maximum limit of active power ($P_{\_MAX}$) are used by the power converter controller 10 to properly control the power converter, both the machine-side converter 12 whereto the electrical generator rotor 11 is connected, and the grid-side converter 13 which connects to the grid through a transformer 14 in a preferred embodiment.

Figure 4:
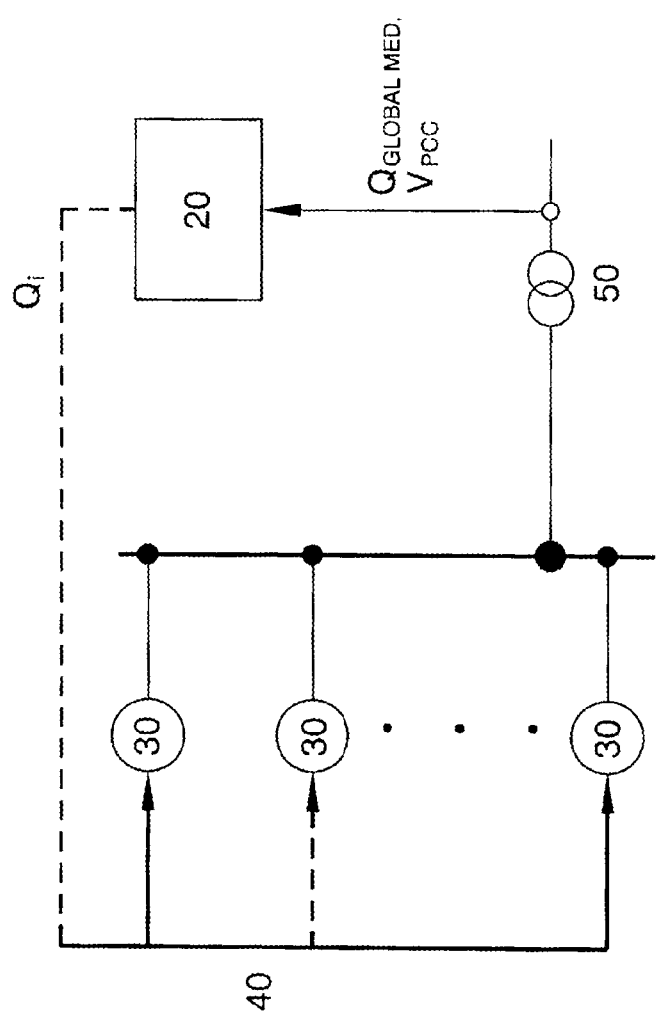
FIG. 4. shows a schematic configuration of a wind farm according to a preferred embodiment of the invention.

According to a preferred embodiment, FIG. 4 shows the diagram of a wind farm connected to the grid through a transformer 50, wherein the wind farm control system 20 receives measurements made at the wind farm connection point of voltage and reactive power ($Q_{GLOBAL\_MED}$, $V_{PCC}$) and sends primary set point of reactive power ($Q_i$) to each wind turbine 30 through the wind farm SCADA network 40 resulting from a voltage control implemented in the wind farm control system 20.

Figure 5:
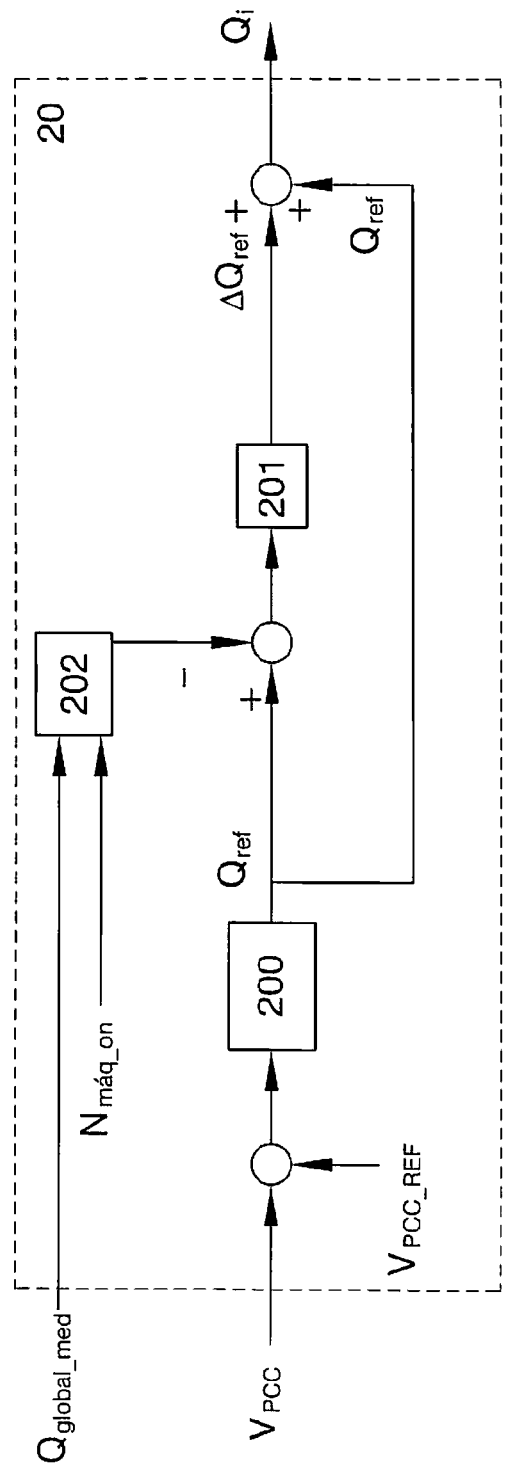
FIG. 5. shows a diagram of a reference tracking loop of global reactive power according to a preferred embodiment of the invention.

FIG. 5 shows the voltage control implemented in the wind farm control system 20 in a preferred embodiment. This receives measurements of reactive power generated by the wind farm ($Q_{\_GLOBAL\_MED}$) and information on the number of operational wind turbines or machines of the wind farm ($N_{\_MAQ\_ON}$). This farm control system includes a first voltage regulator 200 which, based on the error between the measured voltage ($V_{PCC}$) at the connection point and the voltage set point ($V_{REF}$), calculates a first reactive power set point for each machine ($Q_{ref}$).

Based on the information of the reactive power generated by the wind farm ($Q_{\_GLOBAL\_MED}$) and the number of operating machines ($N_{\_MAQ\_ON}$) of the wind farm, in the computing element 202 the reactive power being generated by each machine is calculated and based on the error between this and the reference reactive power ($Q_{ref}$) a second regulator 201 calculates the extra contribution of reactive power ($\Delta Q_{ref}$) each machine must make to ensure the tracking of the reactive power set point of the wind farm.

Thus, if there is any machine that is experiencing limitations and therefore at the output of the wind farm the global reactive power measured ($Q_{\_GLOBAL\_MED}$) does not correspond with the reactive power set point, and while the rest of the machines have sufficient capacity, the latter will compensate for the possible errors due to limitations in any machine.

Figure 6:
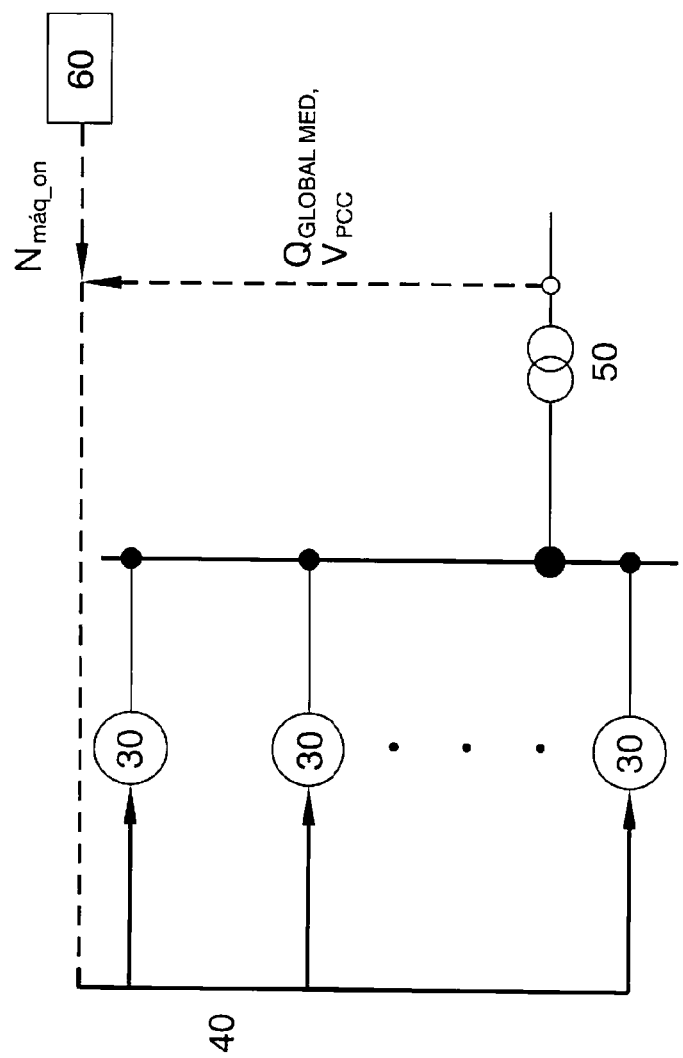
FIG. 6. shows a schematic configuration of a wind farm according to a preferred embodiment of the invention.

In a preferred embodiment, as shown in FIG. 6, the machines receive through the SCADA communication network 40 of the farm information on measurements made at the wind farm connection point to the grid ($Q_{QGLOBAL\_MED}$ and $V_{PCC}$) and data received from a remote point such as remote control 60 of the number of operating machines ($N_{\_MAQ\_ON}$) of the wind farm, so that each one is able to integrate into their local control units the wind farm voltage control at the connection point ($V_{PCC}$).

In this way a control of similar characteristics to a central voltage control is achieved even without having a wind farm control unit.

Figure 7:
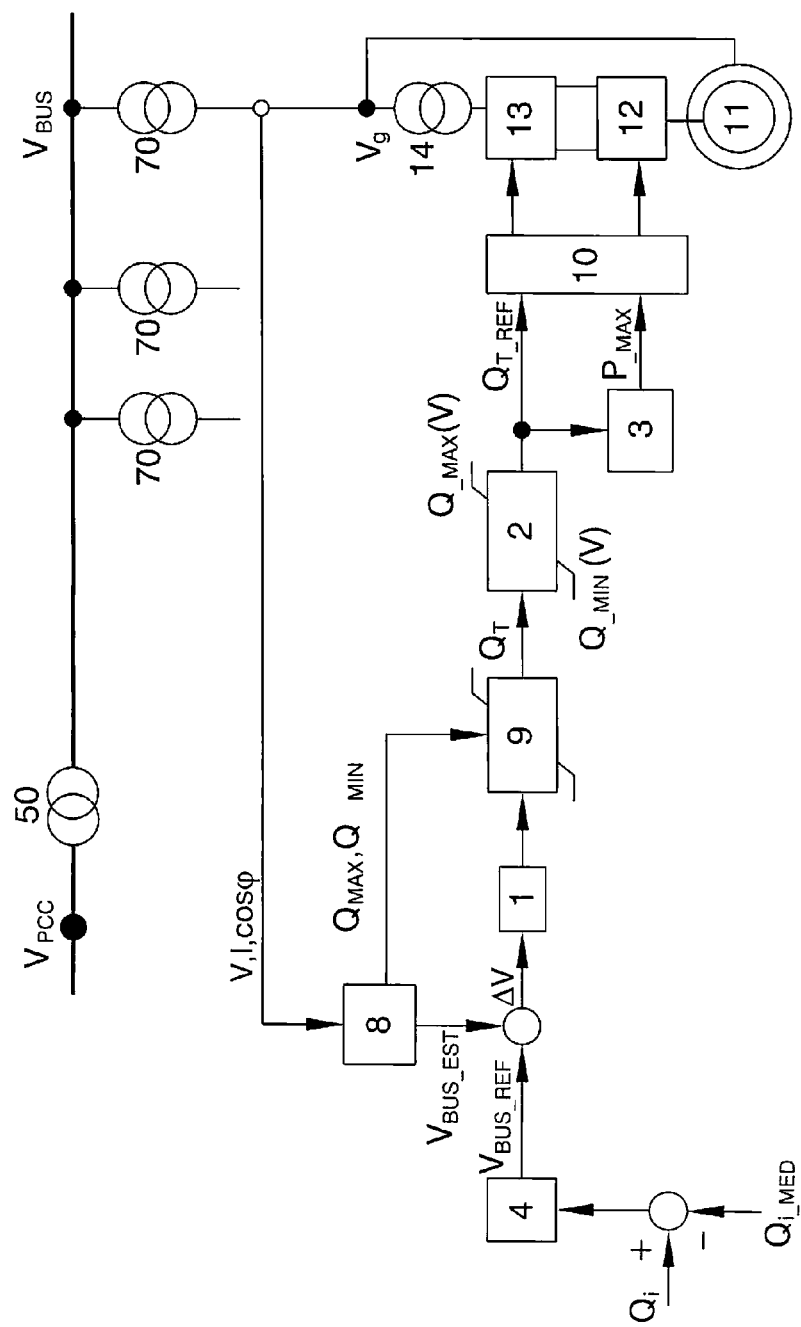
FIG. 7. shows a diagram of the control method of a preferred embodiment wherein the wind turbine is connected to the farm through a transformer.

FIG. 7 shows a diagram of the control method of the present invention in a preferred embodiment in the particular case in which the wind turbine is connected to the grid through a transformer 70, characterized in that it comprises a calculation block 8 of the wind farm grid voltage ($V_{BUS}$).

This calculation block 8 is based on a transformer model and, on the basis of voltage, current and power factor measurements (V, I, cos φ) in the machine terminals it calculates the estimated grid voltage ($V_{BUS\_EST}$) of the wind farm whereto the wind turbine is connected.

Based on said estimated voltage ($V_{BUS\_EST}$) and grid voltage reference of the wind farm ($V_{BUS\_REF}$) the voltage error is calculated, this being the input signal to the block of reactive power regulation 1, at whose output the reactive power set point for the turbine ($Q_T$) is obtained.

Thus, the voltage control is performed on a variable which is more representative of the voltage at the wind farm connection point ($V_{PCC}$) than of the terminal voltage of the machine (V), and is much less variable than the latter.

Thus, with the typical agility of a local control, each machine regulates the reactive power it generates according to a more similar voltage between all machines, yielding a voltage control with a better performance in terms of the grid.

In order to avoid exceeding the limits of the terminal voltage of the machine, the control system of the present embodiment includes a saturator element 9 which receives the set point of maximum reactive power ($Q_{MAX}$) and minimum reactive power ($Q_{MIN}$) as inputs so as not to exceed the permissible voltage limits.

Said values are calculated in calculation block 8 based on the transformer model and voltage, current and power factor measurements (V, I, cos φ) at the machine terminals.

This preferred embodiment allows a voltage control with similar characteristics to those of a two-level control (substation level and machine level), with the advantage of being performed locally on each wind turbine. In a preferred embodiment there is a substation control wherefrom set points are sent to each machine. In this situation, if there is a communication failure with any of the wind turbines, they can continue to contribute to proper voltage control.

In a preferred embodiment and in another aspect of the invention, as shown in FIG. 1, a correction term of the blade pitch angle ($\Delta\beta$) is calculated in an element 15 according to the maximum active power that can be evacuated to the grid ($P_{\_MAX}$) and the available mechanical power ($P_{\_MEC}$), which depends on wind speed, rotational speed and blade pitch angle ($\beta$).

Moreover, the electrical power being generated at the moment before a sudden reduction in the maximum active power that can be evacuated to the grid ($P_{MAX}$) is taken as an indicative value of the available mechanical power.

In a preferred embodiment, to avoid over-braking due to the combined action of the correction of the blade pitch angle ($\Delta\beta$) and the electric torque of the machine, the generator torque control takes into account the above correction of the blade pitch angle.

To calculate the correction of the blade pitch angle ($\Delta\beta$) the current position of the blade angle ($\beta$) must be taken into account.

Figure 8:
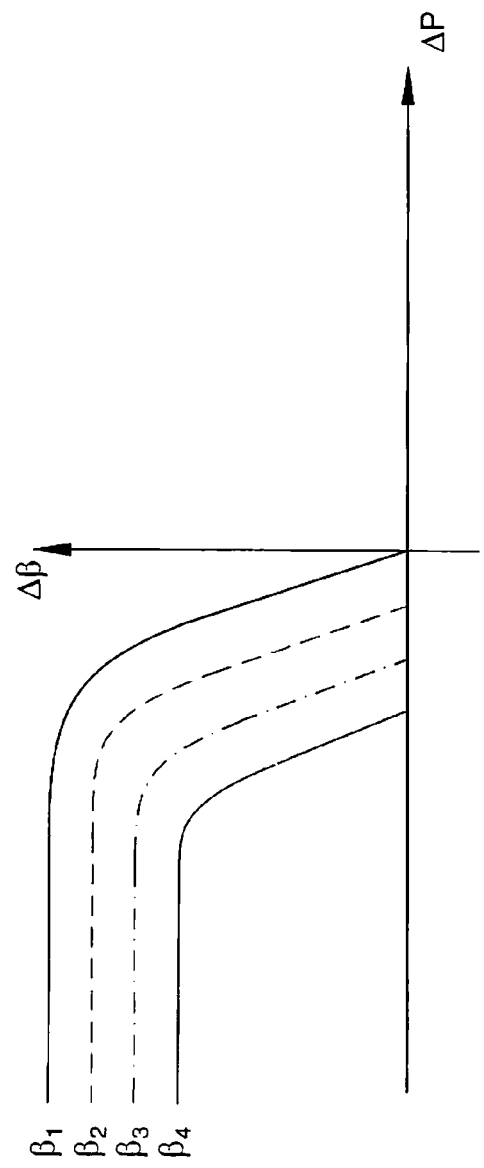
FIG. 8. shows a preferred embodiment of the calculation of the correction term of the blade pitch angle according to the active power difference and the current position of the blade.

FIG. 8 shows a preferred embodiment of the correction angle ($\Delta\beta$) for different positions of the blade pitch angle ($\beta_1$, $\beta_2$, $\beta_3$, $\beta_4$), calculated on the basis of the difference ($\Delta P$) between the available mechanical power ($P_{\_MEC}$) and the maximum power ($P_{MAX}$) it is possible to evacuate to the grid.

A further object of the invention is a wind turbine comprising a rotor, a generator, a frequency converter, a control unit and means for connecting to the farm, so that said control unit is adjusted to implement a method disclosed herein.

A further object of the invention is a method of controlling a wind farm consisting of at least two wind turbines such as those described and a wind farm communications network 40, characterized in that it comprises the following steps:
  measurement of the voltage at the wind farm connection point ($V_{PCC}$),
  calculation of the primary reactive power ($Q_i$) set point according to the difference between the voltage at the connection point and a voltage set point ($V_{PCC\_REF}$), and
  sending the reactive power set points ($Q_i$) to the wind turbines through the wind farm communication network.

What is claimed is:

1. A wind turbine control method of at least one wind turbine comprising a rotor, a generator, a frequency converter, a control unit and means for connecting each wind turbine to a wind farm grid, said method comprising the steps, for each wind turbine, of:
  calculation of a voltage error ($\Delta V$) based on a local voltage set point ($V_{REF}$) and a local measured voltage ($V_{MED}$), and
  calculation of an initial set point of reactive power ($Q_T$) to be generated based on the voltage error ($\Delta V$),
  wherein said method further comprises the following steps of:
  limitation of the initial set point of reactive power ($Q_T$) by applying limits ($Q_{\_MAX}$, $Q_{\_MIN}$) calculated on the basis of the local measured voltage ($V_{MED}$), thus obtaining at least one final set point of reactive power ($Q_{\_REF}$);
  calculation of an apparent power available based on the local measured voltage ($V_{MED}$); and
  calculation of a maximum limit of active power ($P_{\_MAX}$) depending on the final set point of reactive power ($Q_{\_REF}$) and the apparent power available.

2. The wind turbine control method, according to claim 1, further comprising the step, for each wind turbine, of generating the local voltage set point ($V_{REF}$) based on an error between a primary set point of reactive power ($Q_i$) and the reactive power generated by the wind turbine ($Q_{i\_MED}$).

3. The wind turbine control method, according to claim 2, wherein each wind turbine comprises a doubly fed induction generator and the initial set point reactive power to be generated by each wind turbine ($Q_T$) is divided into two set points, an initial set point of reactive power to be generated by the generator stator ($Q_S$) and an initial set point of reactive power to be generated by the grid-side converter ($Q_C$), being distributed based on a distribution parameter ($\alpha_{distribution}$) which optimizes the temperature of the electrical system components.

4. The wind turbine control method, according to claim 3, wherein the reactive power limits ($Q_{\_MAX}$, $Q_{\_MIN}$, $Q_{C\_MAX}$, $Q_{C\_MIN}$, $Q_{S\_MAX}$, $Q_{S\_MIN}$) are applied to the initial set point of reactive power to be generated by the stator ($Q_S$) and the initial set point of reactive power to be generated by the grid-side converter ($Q_C$), thus obtaining a final set point of reactive power to be generated by the stator ($Q_{S\_REF}$) and a final set point of reactive power to be generated by the converter ($Q_{C\_REF}$).

5. The wind turbine control method, according to claim 2, wherein the primary set point of reactive power ($Q_i$) is provided by a wind farm controller through a wind farm communication network.

6. The wind turbine control method, according to claim 2, wherein the primary set point of reactive power ($Q_i$) is calculated based on the error between the voltage measurement at the wind farm connection point ($V_{PCC}$) and a voltage set point at the connection point ($V_{PCC\_REF}$), and the voltage measurement at the connection point ($V_{PCC}$) is received through a wind farm communication network.

7. A wind turbine comprising a rotor, a generator, a frequency converter, a control unit and means for connecting to the wind farm grid wherein said control unit is adjusted to implement a method according to claim 1.

8. The wind farm control method of at least two wind turbines according to claim 1, further comprising the following steps of:
  measurement of the voltage at the wind farm connection point ($V_{PCC}$),
  calculation of a reactive power set point ($Q_i$) according to the difference between the voltage at the wind farm connection point ($V_{PCC}$) and a voltage set point ($V_{PCC\_REF}$), and
  sending the reactive power set point ($Q_i$) to the wind turbines through a wind farm communication network.

9. A wind turbine control method of at least one wind turbine comprising a rotor, a generator, a frequency converter, a control unit and means for connecting each wind turbine to a wind farm grid, said method comprising the steps, for each wind turbine, of:
  calculation of a voltage error ($\Delta V$) based on a local voltage set point ($V_{REF}$) and a local measured voltage ($V_{MED}$), and
  calculation of an initial set point of reactive power ($Q_T$) to be generated based on the voltage error ($\Delta V$),
  wherein said method further comprises the following steps of:
  limitation of the initial set point of reactive power ($Q_T$) by applying limits ($Q_{\_MAX}$, $Q_{\_MIN}$) calculated on the basis of the local measured voltage ($V_{MED}$), thus obtaining at least one final set point of reactive power ($Q_{\_REF}$);
  calculation of a maximum limit of active power ($P_{\_MAX}$) depending on the final set point of reactive power ($Q_{\_REF}$) and the apparent power available; and
  generating the local voltage set point ($V_{REF}$) based on an error between a primary set point of reactive power ($Q_i$) and the reactive power generated by the wind turbine ($Q_{i\_MED}$), wherein terminals of each wind turbine are connected to the wind farm grid through a transformer, and the local voltage set point ($V_{REF}$) corresponds to a reference of the wind farm grid voltage ($V_{BUS}$), the voltage error ($\Delta V$) being calculated as the difference between the local voltage set point ($V_{REF}$) and an estimated wind farm grid voltage ($V_{BUS\_EST}$), the estimated wind farm grid voltage ($V_{BUS\_EST}$) being calculated based on a transformer model and on voltage, current and power factor measurements at the terminals of the wind turbine.

10. The wind turbine control method, according to claim 9, wherein the initial set point of reactive power ($Q_T$) is limited by applying limits calculated on the basis of the transformer model and on voltage, current and power factor measurements and said limits being such that the machine terminal voltage limits are not exceeded.

11. A wind turbine control method of at least one wind turbine comprising a rotor, a generator, a frequency converter, a control unit and means for connecting each wind turbine to a wind farm grid, said method comprising the steps, for each wind turbine, of:

calculation of a voltage error ($\Delta V$) based on a local voltage set point ($V_{REF}$) and a local measured voltage ($V_{MED}$), and calculation of an initial set point of reactive power ($Q_T$) to be generated based on the voltage error ($\Delta V$), wherein said method further comprises the following steps of:

limitation of the initial set point of reactive power ($Q_T$) by applying limits ($Q_{\_MAX}$, $Q_{\_MIN}$) calculated on the basis of the local measured voltage ($V_{MED}$), thus obtaining at least one final set point of reactive power ($Q_{\_REF}$);

calculation of a maximum limit of active power ($P_{\_MAX}$) depending on the final set point of reactive power ($Q_{\_REF}$) and the apparent power available; and limiting the power extracted from the wind depending on a maximum limit of active power ($P_{\_MAX}$) that can be evacuated to the grid by correcting the blade angle in the basis of the maximum limit of active power ($P_{\_MAX}$) that can be evacuated to the grid and an indicative value of the available mechanical power ($P_{\_MEC}$).

12. The wind turbine control method, according to claim 11, wherein the correcting of the blade angle comprises the step of calculating a correction term of the blade angle ($\Delta \beta$) which is based on the difference between the maximum limit of active power ($P_{\_MAX}$) that can be evacuated to the grid and an indicative value of the available mechanical power ($P_{\_MEC}$).

13. The wind turbine control method, according to claim 12, wherein said indicative value of the available mechanical power ($P_{\_MEC}$) is calculated according to the power generated at the moment before a sudden decrease of the maximum limit of active power ($P_{MAX}$).

14. The wind turbine control method, according to claim 13, wherein the torque or power set point is calculated according to the correction of the blade angle ($\Delta \beta$).

15. The wind turbine control method, according to claim 14, wherein said calculation of the correction term of the blade angle ($\Delta \beta$) is further performed depending on the current angle of the blade ($\beta$).

* * * * *